June 2, 1953  O. E. HILL ET AL  2,640,301
GRINDING MACHINE
Filed July 29, 1950  5 Sheets-Sheet 1
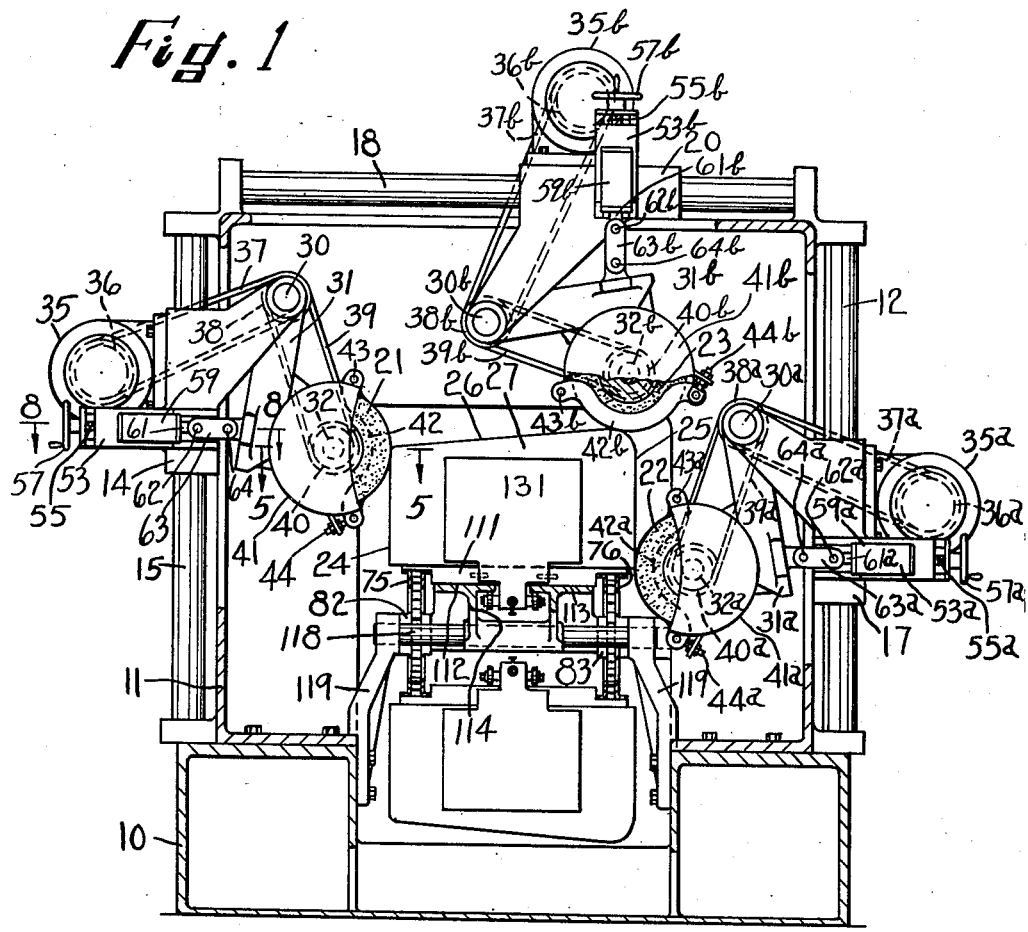
Fig. 1
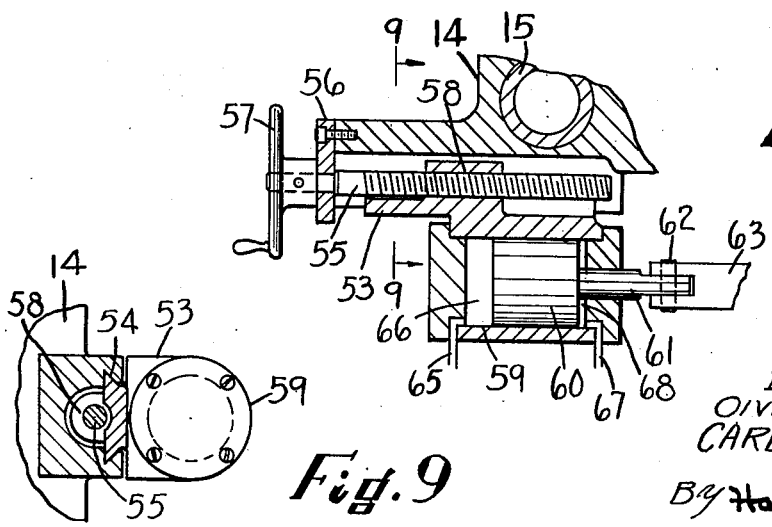
Fig. 8
Fig. 9
Inventor
OIVA E. HILL
CARL G. FLYGARE
By Harold W. Eaton
Attorney

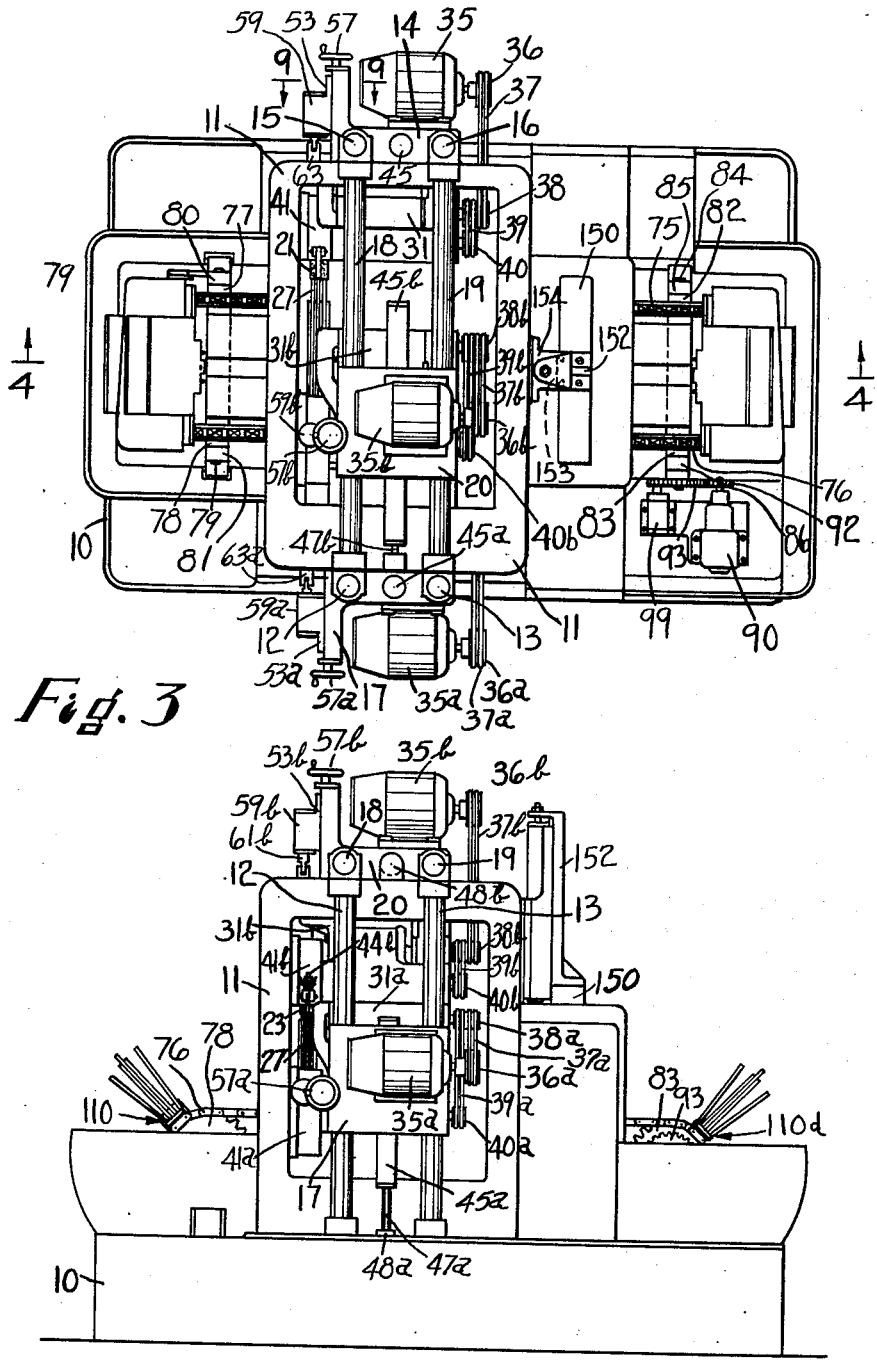

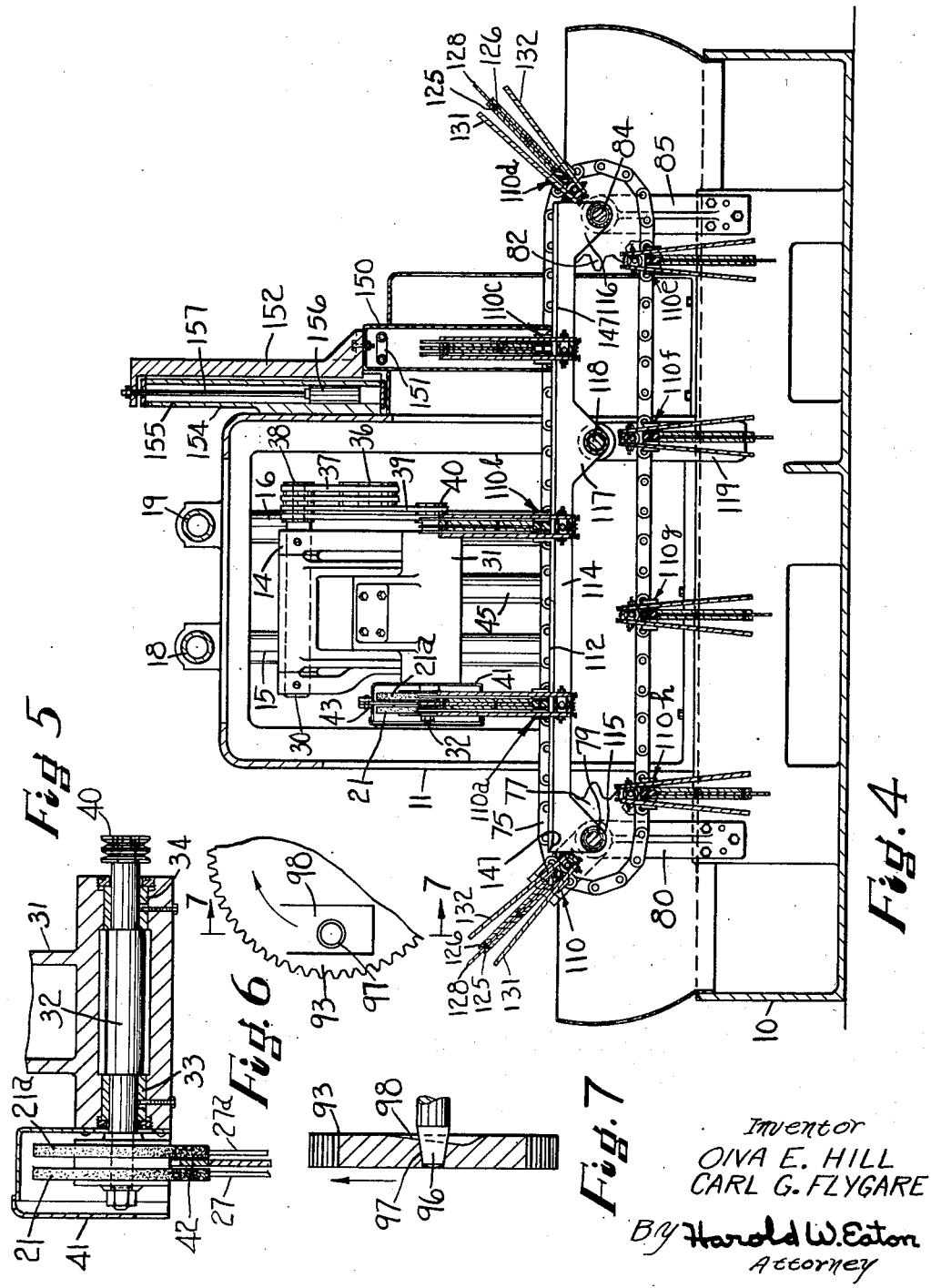

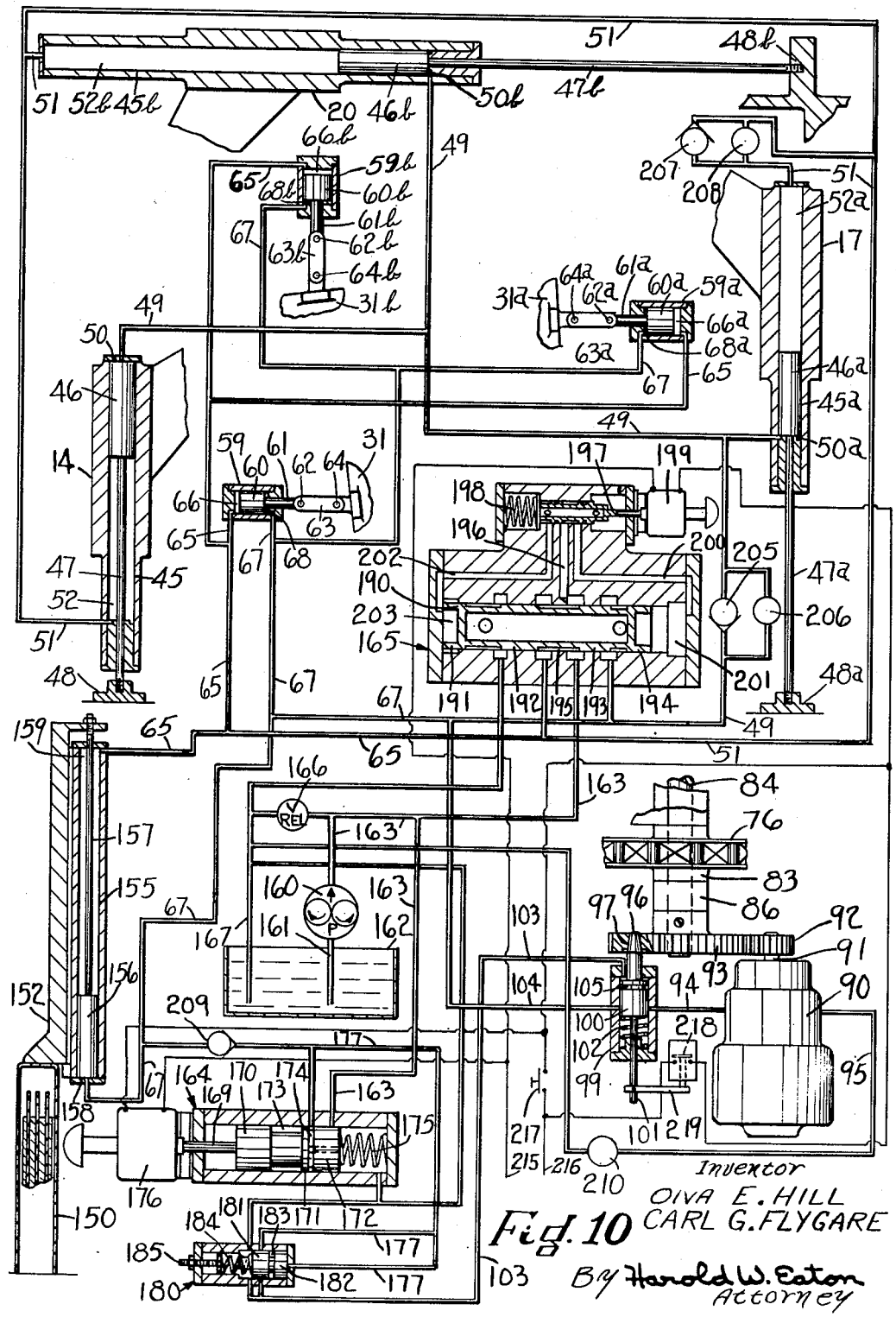

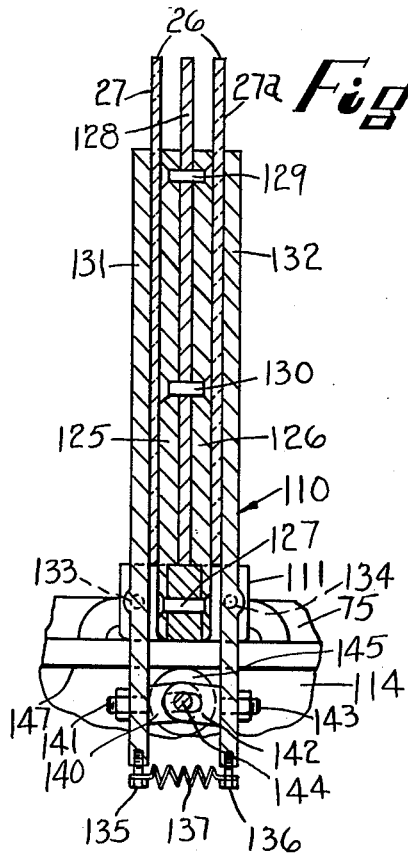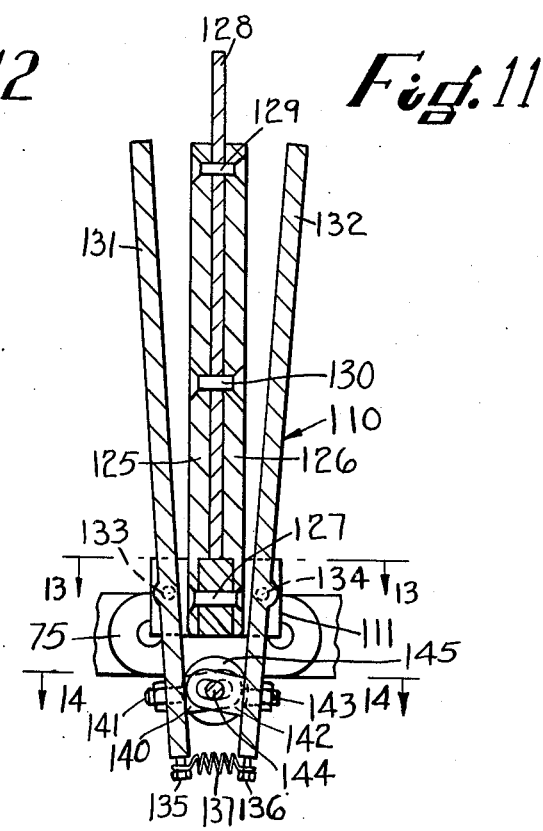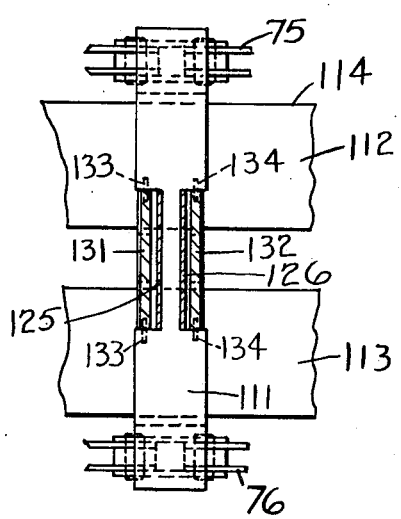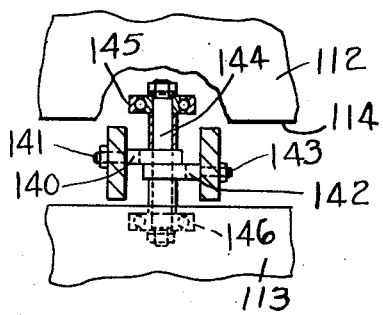
Inventor
OIVA E. HILL
CARL G. FLYGARE
By Harold W. Eaton
Attorney Patented June 2, 1953

2,640,301

UNITED STATES PATENT OFFICE 2,640,301

GRINDING MACHINE

Oiva E. Hill, West Boylston, and Carl G. Flygare, Worcester, Mass., assignors to Norton Company, Worcester, Mass., a corporation of Massachusetts Application July 29, 1950, Serial No. 176,574

11 Claims. (Cl. 51—100)

The invention relates to grinding machines, and more particularly to a machine for simultaneously grinding a plurality of edge portions of a flat workpiece.

One object of the invention is to provide a simple and thoroughly practical grinding machine for grinding a plurality of edge portions of a flat workpiece to a predetermined size and contour. Another object of the invention is to provide an edge grinding machine for simultaneously grinding a plurality of edges on a plurality of workpieces to predetermined sizes and contours. Another object of the invention is to provide an edge grinding machine with a plurality of grinding wheel assemblies for simultaneously grinding a plurality of edge portions to predetermined contours. Another object of the invention is to provide an edge grinding machine in which a plurality of workpieces may be simultaneously ground in which a master form or template is provided for controlling the shape and size of the workpiece being ground. A further object of the invention is to provide an endless conveyor type work support having a plurality of work holders each being provided with a master template for clamping a workpiece automatically as the workpiece approaches a grinding position. Another object of the invention is to provide a plurality of toggle actuated work clamping devices for clamping workpieces in a predetermined position relative to the master template for a grinding operation. Another object of the invention is to provide an edge grinding machine with a work washing station whereby the grinding lubricant and coolant fluid may be removed from the ground workpieces before the workpieces reach an unloading position. Another object of the invention is to provide a power driven mechanism for intermittently indexing an endless type work conveyor to locate successive workpieces in grinding positions. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of various possible embodiments of the mechanical features of this invention, Fig. 1 is a front elevation of the improved edge grinding machine, having part of the base broken away and shown in sections;

Fig. 2 is a side elevation of the machine, on a reduced scale;

Fig. 3 is a plan view of the machine, on a reduced scale;

Fig. 4 is a vertical section, on an enlarged scale, taken approximately on the line 4—4 of Fig. 3, showing the work conveying mechanism;

Fig. 5 is a fragmentary sectional view, on an enlarged scale, taken approximately on the line 5—5 of Fig. 1, through one of the grinding wheel heads;

Fig. 6 is a fragmentary detail view, on an enlarged scale, of the driving gear for the work conveyor;

Fig. 7 is a sectional view, taken approximately on the line 7—7 of Fig. 6, through the driving gear;

Fig. 8 is a horizontal sectional view, on an enlarged scale, taken approximately on the line 8—8 of Fig. 1, through one of the grinding wheel actuating mechanisms;

Fig. 9 is a fragmentary sectional view, on an enlarged scale, taken approximately on the line 9—9 of Figs. 3 and 8, through the cross slide of one of the wheel actuating mechanisms;

Fig. 10 is a combined hydraulic and electrical diagram of the actuating mechanisms of the machine;

Fig. 11 is a fragmentary vertical sectional view, on an enlarged scale, through one of the work holders, shown in an open position;

Fig. 12 is a similar fragmentary vertical sectional view, of one of the work holders, shown in a closed position;

Fig. 13 is a horizontal sectional view, taken approximately on the line 13—13 of Fig. 11; and Fig. 14 is a horizontal sectional view, taken approximately on the line 14—14 of Fig. 11.

A grinding machine has been illustrated in the drawings comprising a base 10 which supports a hollow box-like frame 11. The box-like frame 11 serves as a support for a pair of spaced vertical tubular slide rods 15 and 16 for supporting a grinding wheel slide 14. The frame 11 also supports a pair of vertically arranged spaced tubular slide rods 12 and 13 which serve to support a slidably mounted wheel slide 17. The upper portion of the frame 11 supports a pair of spaced parallel tubular slide rods 18 and 19 for slidably supporting a wheel slide 20. The wheel slides 14, 17 and 20 are arranged to support rotatable grinding wheels 21, 22 and 23 respectively for simultaneously grinding a plurality of edges 24, 25 and 26 of a workpiece 27 to the desired size and contour. Each of the work slides 14, 17 and 20 are identical in construction, consequently only one of the slides has been illustrated in detail.

The wheel slide 14 is provided with a pivot shaft 30 which supports a pivotally mounted wheel head 31. A rotatable wheel spindle 32 (Fig. 5) is journalled in suitable bearings 33 and 34 fixedly mounted within the head 31. The spindle 32 serves as a support for a pair of spaced grinding wheels 21 and 21a which are arranged simultaneously to grind the edges of a pair of spaced workpieces 27 and 27a. An electric motor 35 is mounted on the wheel slide 14. The motor 35 is provided with a pulley 36 which is drivingly connected by V-belts 37 with a pulley 38 mounted on the shaft 30. The pulley 38 is connected by multiple V-belts 39 with a pulley 40 mounted on the right hand end of the wheel spindle 32 (Fig. 5). The grinding wheels 21 and 21a are partially surrounded by a wheel guard 41 which is fixedly mounted on the head 31. The wheel guard 41 also serves as a support for an adjustably mounted arcuate-shaped follower 42. One end of the follower 42 is pivotally connected to the guard 41 by a stud 43. The other end of the follower is adjustably connected to the guard 41 by a screw 44. The operative face of the guard is formed with a partial cylindrical face of substantially the same curvature as the peripheral faces of the grinding wheels 21 and 21a.

A fluid pressure operated traversing mechanism is provided for traversing the wheel slide 14 in a vertical direction during a grinding operation. This mechanism may comprise a cylinder 45 formed integral with the slide 14. The cylinder 45 contains a slidably mounted piston 46 having a piston rod 47, the lower end of which is fastened to a bracket 48 which is fixedly mounted relative to the base 10. When fluid under pressure is passed through a pipe 49 into a cylinder chamber 50 (Fig. 10), the cylinder 45 together with the wheel slide 14 will be moved upwardly in a vertical direction. During this movement of the cylinder 45 and the wheel slide 14, fluid within a cylinder chamber 52 will exhaust through a pipe 51. Similarly when fluid under pressure is passed through the pipe 51 into the cylinder chamber 52, the cylinder 45 together with the wheel slide 14 will be moved in a downward direction.

A fluid pressure actuating mechanism is provided for swinging the wheel head 31 to maintain the follower 42 in operative engagement with a template to be hereinafter described. This mechanism may comprise a transversely adjustable slide 53 having dove-tailed slide ways 54 which mate with correspondingly shaped ways on the wheel slide 14. A rotatable feed screw 55 is supported by an end cap 56 which is fastened to the left hand end of the wheel slide 14 (Fig. 8). A manually operable end wheel 57 is mounted on the left hand end of the feed screw 55 to facilitate adjustment thereof. The feed screw 55 meshes with a nut 58 formed on the transversely movable slide 53. The slide 53 is provided with a cylinder 59 which contains a slidably mounted piston 60. A piston rod 61 fixedly carried by the piston 60 is connected by a stud 62 with a link 63. The link 63 is connected by a stud 64 with the wheel head 31. When fluid under pressure is passed through a pipe 65 into a cylinder chamber 66, the piston 60 is moved toward the right (Fig. 8) to swing the wheel head 31 on the shaft 30 to position the follower 42 in operative engagement with the template to be hereinafter described. During this movement of the piston 60 fluid within a cylinder chamber 68 is exhausted through a pipe 67. The slide 53 is preferably adjusted so that the piston 60 does not engage the right hand end of the cylinder 59 when the follower 42 is in engagement with the template. Similarly when fluid under pressure is passed through the pipe 67 into the cylinder chamber 68, the piston 60 will be moved toward the left (Fig. 8) to swing the wheel head 31 in a clockwise direction (Fig. 1) to move the grinding wheels 21 and 21a and the follower 42 to an inoperative position.

The wheel slide 17 is identical in construction with the wheel slide 14. Corresponding parts have been indicated by the same numerals with the suffix "a". The wheel slide 17 supports a rock shaft 30a which serves as a support for a pivotally mounted wheel head 31a. The wheel head 31a serves as a support for a rotatable wheel spindle 32a (Fig. 1) which supports a pair of spaced grinding wheels 22, only one of which is shown in Fig. 1. An electric motor 35a is mounted on the wheel slide 17. The motor 35a is provided with a pulley 36a which is connected by multiple V-belts 37a with a pulley 38a mounted on the shaft 30a. The pulley 38a is also connected by multiple V-belts 39a with a pulley 40a mounted on the end of the wheel spindle 32a. A wheel guard 41a partially surrounds the grinding wheels 22 and serves as a support for a follower 42a which is connected at one end by a stud 43a with the wheel guard 41a. The other end of the follower 42a is connected by an adjusting screw 44a. The follower 42a is arranged mid-way between the spaced wheels 22 and is arranged to engage an edge portion of the template to be hereinafter described.

A hydraulically operated traversing mechanism is provided for the wheel slide 17 which is identical in construction in connection with that previously described for traversing the wheel slide 14. This mechanism may comprise a cylinder 45a which is formed integrally with the wheel slide 17. The cylinder 45a contains a slidably mounted piston 46a which is connected to one end of a piston rod 47a. The lower end of the piston rod 47a is fixedly connected by a bracket 48a with the base 10. It will be readily apparent from the foregoing disclosure that when fluid pressure is passed through either the pipe 49 or the pipe 51, the wheel slide 17 will be traversed in a vertical direction.

The wheel slide 17 is similarly provided with a transversely movable slide 53a which is arranged to be adjusted transversely relative to the wheel slide 17 by means of a feed screw 55a which is actuated by a hand wheel 57a. The transversely movable slide 53a is provided with a cylinder 59a having a piston (not shown) connected to move a piston rod 61a. The piston rod 61a is connected to one end of a link 63a, the other end of which is pivotally connected to the wheel head 31a. The transversely movable slide 53a and the cylinder 59a serve to control the swinging movement of the wheel head 31a in a manner identical with that described in connection with the wheel head 31.

The wheel slide 20 supports a rotatable rock shaft 30b which serves as a support for a pivotally mounted wheel head 31b. The wheel head 31b is provided with a rotatable wheel spindle 32b which supports a pair of spaced grinding wheels 23. An electric motor 35b mounted on the wheel slide 20 is provided with a pulley 36b which is connected by multiple V-belts 37b with a pulley 38b mounted on the rotatable shaft 30b. The pulley 38b is also connected by multiple V-belts 39b with a pulley 40b mounted on the end of the wheel spindle 32b. The grinding wheels 23 are partially surrounded by a wheel guard 41b which is fixedly mounted on the wheel head 31b. The wheel guard 41b serves as a support for an arcuate shaped follower 42b one end of which is pivotally connected by a stud 43b with the wheel guard 41b. The other end of the follower 42b is connected with the wheel guard 41b by means of an adjustable screw 44b by means of which the follower 42b may be adjusted so that its operative face is aligned with the peripheries of the spaced grinding wheels 23.

A fluid pressure traversing mechanism is provided for the horizontally movable wheel head 20 comprising a cylinder 45b which contains a slidably mounted piston 46b connected to one end of a piston rod 47b. The other end of the piston rod 47b is fixedly connected to an upwardly projecting portion 48b formed integral with the frame 11. It will be readily apparent from the foregoing disclosure that when fluid under pressure is passed through either the pipe 49 or the pipe 51, the cylinder 45b together with the wheel slide 20 will be traversed in a horizontal direction.

The wheel slide 20 is similarly provided with a transversely arranged slide 53b which is arranged to be adjusted transversely relative to the wheel slide 20 by means of a feed screw 55b which is actuated by a hand wheel 57b. The tranversely movable slide 53b is provided with a cylinder 59b containing a piston (not shown) which is connected to one end of a piston rod 61b. The lower end of the piston rod 61b is pivotally connected to one end of a link 63b, the other end of which is pivotally connected to the wheel head 31b.

The three wheel slides 14, 17 and 20 are arranged to operate simultaneously to grind the three sides 24, 25 and 26 respectively of a pair of spaced work pieces 27.

An endless type work conveyer is provided for automatically conveying successive work pieces to and from a grinding position. This mechanism may comprise a pair of spaced endless link chains 75 and 76 which are supported at one end by a pair of spaced sprockets 77 and 78. The sprockets 77 and 78 are mounted on a rotatable shaft 79 which is in turn supported by a pair of spaced brackets 80 and 81 which are fastened to the base 10 of the machine (Fig. 1). Similarly the other end of the link chains 75 and 76 are supported by a pair of spaced sprockets 82 and 83 which are mounted on a rotatable shaft 84. The shaft 84 is supported by brackets 85 and 86 which are in turn fixedly mounted on the base 10 of the machine.

A suitable driving mechanism is provided for intermittently indexing the link chains 75 and 76 successively to position work pieces in operative relationship with the grinding wheels. This mechanism may comprise a rotary type fluid motor 90 (Figs. 3 and 10) having a driven shaft 91 which supports a gear 92. The gear 92 meshes with a gear 93 fixedly mounted on the end of the shaft 84. A frusto-conically shaped detent 96 engaging a frusto-conically shaped hole or aperture 97 formed in the gear 93 serves normally to hold the chains 75 and 76 in an indexed position.

A suitable mechanism is provided for automatically controlling the detent 96 to initiate an indexing movement of the link chains 75 and 76 in timed relationship with the cycle of operation. This mechanism may comprise a fluid pressure cylinder 99 having a slidably mounted piston 100. The piston 100 is connected to one end of a piston rod 101, on the end of which is formed the detent 96. A compression spring 102 contained within the cylinder 99 normally serves to hold the piston 100 in an uppermost position with the detent 96 in operative engagement with the aperture 97 to hold the link chains 75 and 76 stationary in an indexed position.

The cylinder 99 and piston 100 serve also as a valve to control the passage of fluid under pressure to start or stop the fluid motor 90. When fluid under pressure is passed through a pipe 103 into the upper end of the cylinder 99 (Fig. 10), the piston 100 moves downwardly against the compression of the spring 102. When the piston 100 reaches its lowermost position, fluid under pressure within a pipe 104 may pass through a valve chamber 105 formed in the piston 100 and pass through the pipe 94 to actuate the fluid motor 90. The fluid motor 90 remains operative as long as the detent 96 is held out of engagement with the aperture 97.

It is desirable to slow down the indexing movement of the link chains 75 and 76 before the workholder reaches a grinding position. This is preferably accomplished by providing a cam face 98 on the side face of the gear 93. When pressure is relieved from the pipe 103, the released compression of the spring 102 causes the piston 100 and detent 96 to move upwardly into engagement with the side face of the gear 98. When the gear 93 turns so that the cam face 98 moves into engagement with the end of the detent 96, the piston 100 moves upwardly to gradually close off the passage of fluid from the pipe 104 into the valve chamber 105 thereby slowing down the fluid motor 90. As soon as the detent 96 is forced into the aperture 97 by the compression of the spring 102, fluid is completely cut off thereby stopping the motor 90 with the link chains 75 and 76 in an indexed position.

The link chains 75 and 76 are provided with a plurality of spaced work holders 110, 110a, 110b, 110c, 110d, 110e, 110f, 110g and 110h. Work pieces such as a pair of plates of glass 27 and 27a are loaded into the work holders when in position 110. On the next indexing movement of the chains 75 and 76 the work holder 110 moves into position 110a in which position three edges of the plates of glass 27 and 27a are ground to predetermined shapes. The grinding operation is a wet grinding operation in which either oil or other fluid lubricant is used to facilitate the grinding action and also to cool the work pieces being ground. On succeeding indexing operations the work holder 110 moves into position 110b and then to 110c in which position the coolant fluid is flushed off the work and the holder by a mechanism to be hereinafter described. The work holder then moves on the next indexing into position 110d, in which position the work holder opens and the ground plates of glass 27 and 27a are removed.

The work holders 110 comprise a transversely extending member 111 (Fig. 1) which extends across the link chains 75 and 76 and is fixedly connected thereto, either by welding or riveting or other suitable fastening means. The members 111 are arranged to slide upon a pair of spaced parallel plane surfaces 112 and 113 of a supporting member 114. The supporting member 114 is provided with downwardly extending lugs 115 and 116 having apertures which are supported on the shafts 79 and 84. The member 114 is also provided with an intermediate downwardly extending lug 117 which is supported by a shaft 118 carried by a pair of spaced brackets 119 which are in turn fixedly mounted on the base 10. The transversely extending members 111 serve as a support for a pair of spaced plates 125 and 126 which are fastened thereto by rivets 127. A template or master form 128 is positioned between the plates 125 and 126 and is fixedly mounted thereto by rivets 129 and 130. A pair of work clamping plates 131 and 132 are arranged on opposite sides of the sheets of glass 27 and 27a to be ground. The clamping plates 131 and 132 are pivotally connected by studs 133 and 134 with the transversely extending member 111. Downwardly extending portions of the plates 131 and 132 are provided with studs 135 and 136 which are connected together by means of a tension spring 137. The spring 137 normally tends to hold the work clamping plates 131 and 132 in an open position.

It is desirable to provide a suitable mechanism for automatically actuating the clamping plates 131 and 132 automatically to clamp plates of glass 107 and 108 in position for a grinding operation during movement of the work holder from position 110 to 110a. It is similarly desirable to automatically release the clamping plates 131 and 132 when the work holder 110 moves into position 110d so that the ground plates of glass 27 and 27a may be readily removed therefrom. As illustrated in the drawings a toggle-actuated mechanism is provided comprising a toggle arm 140 which is fastened to the plate 131 by means of a screw 141. A toggle arm 142 is fastened to the clamping plate 132 by means of a screw 143. The toggle arms 140 and 142 are connected to a common stud 144. The stud 144 is provided with a pair of rollers 145 and 146 which are arranged to engage a cam 147 formed on the underside of the plane surfaced portions 112 and 113 of the member 114. It will be readily apparent that when the workholder 110 moves from position 110 into position 110a, the rollers 145 and 146 move into engagement with the cam 147 which operates to move the toggle arms into the positions illustrated in Fig. 12 with the clamping plates 131 and 132 swung towards each other to clamp the plates of glass 27 and 27a in a predetermined position with relation to the template or master form 128. Similarly when the work holder 110 moves into position 110d, the rollers 145 and 146 ride off the cams 147 thereby releasing the tension of the spring 137 to swing the clamping plates 131 and 132 to an unclamped position so that the ground plates of glass 27 and 27a may be readily removed therefrom. The clamping plates 131 and 132 remain in an open position during successive indexing movements as they pass through positions 110e, 110f, 110g and 110h into the position 110 where new work pieces are loaded into the work holder. In order to facilitate clamping action of the toggle arms 140 and 142, slightly elongated apertures are provided through which the stud 144 passes. It will be readily apparent from the foregoing disclosure that the cams 147 together with the tension of the spring 137 serve to clamp and unclamp plates of glass supported in the work holders 110.

The glass grinding operation is a wet grinding in which either oil or other grinding coolants and lubricants are employed to facilitate the cutting action of the grinding wheels and also to facilitate cooling the work pieces being ground. The coolant fluid after grinding leaves the work pieces coated with residue of the cutting or cooling fluid. It is desirable to provide a suitable means whereby the residue of coolant or cutting fluid may be removed not only from the work pieces but also from the work holder before the work holder reaches an unloading or unclamping position. When the work holders are indexed to position 110c, a guard 150 is lowered into position to surround the work holder 110 after which a stream of cleaning fluid is passed through the nozzles 151. The guard 150 is supported by a vertically arranged slide 152 (Fig. 4) which is provided with a dove-tailed slideway 153. The dove-tailed slideway 153 mates with a correspondingly shaped way formed on a vertically arranged member 154 which is fixedly mounted to the frame 11.

In order to facilitate automatic operation of the guard 150, a hydraulically operated mechanism is provided comprising a fluid pressure cylinder 155 formed within the member 154. The cylinder 155 contains a slidably mounted piston 156 which is connected by means of a piston rod 157 with the vertically movable slide 152. When fluid under pressure is passed through the pipe 67 (Fig. 10) into a cylinder chamber 158 formed at the lower end of the cylinder 155, the piston 156 will be moved upwardly to impart a corresponding movement to the vertical slide 152 and the guard 150. Similarly when fluid under pressure is passed through the pipe 65 into a cylinder chamber 159, the piston 156 will be moved downwardly to lower the slide 152 and the guard 150 into an operative position surrounding the work holder 110 when in position 110c to facilitate washing off the residue of cutting and cooling fluid.

A fluid pressure system is provided for supplying fluid under pressure to the various cylinders previously described. This system may comprise a motor driven fluid pump 160 which draws fluid through a pipe 161 from a reservoir 162 (Fig. 10) and passes fluid under pressure through a pipe 163 to a solenoid-actuated control valve 164 and also to a solenoid-actuated control valve 165. A fluid pressure relief valve 166 is connected in the pipe line 163 to facilitate exhausting excess fluid under pressure through a pipe 167 so as to maintain a predetermined operating pressure within the system.

The solenoid-actuated control valve 164 is provided for controlling the movement of the detent or pawl 96 so as to control the indexing movement of the link chains 75 and 76. The valve 164 is a piston type control valve comprising a valve stem 169 having valve pistons 170, 171 and 172 formed integrally therewith. The valve pistons 170, 171 and 172 form valve chambers 173 and 174. A compression spring 175 serves normally to hold the valve 164 in the position illustrated in Fig. 11. A solenoid 176 is provided for shifting the valve 164 toward the left when energized. The valve 164 serves not only to control the operation of the pawl or detent 96 but also to admit fluid under pressure through the pipe 67 into the cylinder chamber 158 to raise the guard 150 to an inoperative position. It is desirable to provide a suitable mechanism to time the raising of the guard 150 with the actuation of the detent 96 so that the guard 150 is moved to an inoperative position before fluid under pressure can be passed through the pipe 103 into the cylinder 99 to withdraw the detent 96 and thereby initiate an indexing movement of the link chains 75 and 76. In order to facilitate timing of the operation of these two mechanisms, a sequence valve 180 is provided. This valve comprises a pair of spaced pistons 181 and 182 having a valve chamber 183 formed therebetween. A compression spring 184 is provided normally to hold the pistons 181 and 184 in a right hand end position (Fig. 10). An adjusting screw 185 is provided in the left hand end of the sequence valve 180 to facilitate adjusting the compression of the spring 184 thereby facilitating the operation of the sequence valve 180. When the solenoid 176 is energized to shift the valve stem 169 into a right hand end position, fluid under pressure passing through the pipe 163 passes through the valve chamber 173 and out through a pipe 177 into a right hand end chamber in the sequence valve 180 to move the valve pistons 181 and 182 toward the left against the compression of the spring 184. At the same time fluid under pressure passing through the pipe 177 may pass through a ball check valve 209 and through the pipe 67 into the cylinder chamber 158 to cause an upward movement of the piston 156 and the washer guard 150 to move them to an upward or inoperative position. The compression of the spring 184 is adjusted so that the guard 150 is in an inoperative position before the valve pistons 181 and 182 move toward the left to connect the pipe 177 with the valve chamber 183. When the valve chamber 183 moves to a position opposite the port at the end of the pipe 177, fluid under pressure may pass through the valve chamber 183 and through the pipe 103 into the upper end of the cylinder 99 to cause a downward movement of the valve piston 100 thereby withdrawing the detent 96 from the aperture 97. When the piston 100 has moved downwardly a sufficient distance, fluid under pressure within the pipe 104 may pass through the valve chamber 105 and through the pipe 94 to start the fluid motor 90 thereby producing an indexing movement of the link chains 75 and 76.

The solenoid-actuated valve 165 is provided for controlling the admission to and exhaust of fluid from the cylinders 45, 45a and 45b to control the traversing movement of the wheel slides 14, 17 and 20 respectively. The valve 165 contains a shuttle-type reversing valve member 190 having a plurality of valve pistons 191, 192, 193 and 194 formed integrally therewith. Fluid under pressure passing through the pipe 163 enters a valve chamber 195 formed between the valve pistons 192 and 193 and passes out through a passage 196 to a pilot valve 197. The pilot valve 197 is normally held in a right hand end position by means of a compression spring 198. A solenoid 199 is provided automatically to shift the pilot valve 197 toward the left when energized. In the position of the pilot valve 197 (Fig. 10) fluid under pressure passing through the pipe 196 passes through a passage 200 into an end chamber 201 to move the shuttle-type valve member 190 towards the left.

Similarly when the solenoid 199 is energized, the valve 197 is shifted toward the left so that fluid under pressure passing through the passage 196 may pass through a passage 202 into an end chamber 203 to shift the shuttle type valve member 190 toward the right into its right hand end position thereby reversing the flow of fluid passing through the valve member 165 to the cylinders 45, 45a, and 45b.

In the position of the valve 165 (Fig. 10), fluid passing through the pipe 163 passes through the valve chamber 195 and through the pipes 51 and 65. Fluid passing through pipe 51 passes into the lower chamber 52 of the cylinder 45, into the upper chamber 52a of the cylinder 45a and into the cylinder chamber 52b of the cylinder 45b and into the cylinder chamber 52b of the cylinder 45b to impart motion to the wheel slides 14, 17 and 20. Fluid passing through the pipe 65 passes into the cylinder chamber 159 in the cylinder 155 to cause a downward movement of the piston 156 to position the guard 150 in an operative position. Fluid passing through the pipe 65 also passes into the cylinder chambers 66, 66a and 66b of the cylinders 59, 59a and 59b respectively to swing the wheel heads 31, 31a and 31b into operative positions with the respective followers 42, 42a and 42b in engagement with the master form or template 128.

When the shuttle valve member 190 is shifted into a reverse position, that is, when solenoid 199 is energized, fluid passing through the pipe 63 passes through the valve chamber 195 and out through the pipes 49 and 67. Fluid passing through the pipe 49 passes through a check valve 205 into the cylinder chambers 50, 50a and 50b of the cylinders 45, 45a and 45b to cause the wheel slides 14, 17 and 20 to move in the reverse direction. A throttle valve 206 is provided whereby fluid passing through the pipe 49 toward the valve 165 may by-pass the check valve 205 at a controlled rate as governed by the setting of the valve 206.

Fluid under pressure passing through the pipe 67 passes into the opposite ends of the cylinders 59, 59a and 59b to swing the wheel heads 31, 31a and 31b to inoperative positions after a grinding operation has been completed.

The wheel slide 17 grinds as it moves upwardly and stops at the end of a grinding operation in an uppermost position. At the start of a grinding cycle, the wheel slide 17 moves downwardly before the wheel head 31a swings into an operative position. It is desirable to provide suitable control for the downward movement of the slide 17. This is accomplished by providing a throttle valve 208 which serves to regulate the exhaust of fluid through the pipe 51 from the cylinder chamber 52a into the pipe 51. A check valve 207 is provided to allow substantially unrestricted flow of fluid from the pipe 51 into the cylinder chamber 52a when the wheel slide 17 is moved in an upward direction.

A check valve 209 is provided between the pipe line 177 and the pipe 67 so that fluid from the solenoid actuated valve 64 may pass through the pipe 177 into the cylinder chamber 158 of the cylinder 155. The check valve 209, however, prevents fluid under pressure passing through the pipe 67 from passing into the pipe 177.

A throttle valve 210 is provided in the pipe 95 to facilitate regulating the exhaust of fluid from the fluid motor 90 thereby controlling the speed of the indexing movement of the link chains 75 and 76.

A suitable electric control is provided for the solenoids 176 and 198 comprising power lines 215 and 216. A manually operable switch 217 is provided for closing the circuit simultaneously to energize both of the solenoids 176 and 199. A normally open limit switch 218 is provided for closing the circuits after the initial starting of the indexing movement of the chains 75 and 76. The limit switch 218 is actuated by an arm 219 which is fixedly mounted on a downwardly extending portion of the piston rod 101.

The operation of the grinding machine will be readily apparent from the foregoing disclosure. As shown in Fig. 10, the wheel slides 14, 17 and 20 are shown in a starting position, that is, where the wheels stop after a grinding operation. The wheel slide 14 is in a lowermost position, the slide 17 in an uppermost position and the slide 20 in a left hand end position. Before starting a new grinding cycle the operator places a pair of glass plates 27 and 27a to be ground in the work holder 110 when in position 110a (Fig. 4). When it is desired to start a grinding operation, the operator closes the switch 217 to energize the solenoids 176 and 199. Energizing the solenoid 176 shifts the valve stem 169 toward the right so that fluid under pressure may pass through the pipe 177 through the ball check valve 209, the pipe 67 into the cylinder chamber 158 to raise the piston 156 and the washer guard 150 to an inoperative position. Fluid under pressure passing through the pipe 67 also passes to the cylinders 59, 59a and 59b to rock the wheel heads 31, 31a and 31b to inoperative positions out of engagement with the work. When fluid under pressure builds up within the pipe 177 sufficiently to move the valve pistons 181—182 toward the left against the compression of the spring 184, fluid in the pipe 177 may pass through the valve chamber 183 through the pipe 103 into the upper end of the cylinder 99 to cause a downward movement of the piston 100 which withdraws the detent 96.

The energizing of the solenoid 199 shifts the pilot valve 197 toward the left so that fluid under pressure passes into the end chamber 203 to shift the shuttle-type valve member 190 toward the right. In this position of the valve fluid under pressure in the pipe 163 may pass through the pipe 67, through the pipe 104, through the valve chamber 105, through pipe 94 to start the fluid motor 90. The fluid motor 90 indexes the link chains 75 and 76 to shift the work holder 110 into position 110a. Just before the work holder 110 reaches position 110a, the compression of the spring 102 causes the detent to ride on the face of the gear 93. As the gear rotates, the detent follows the cam face 98 which allows the valve piston 100 to move upwardly gradually to cut off the supply of fluid pressure passing from the pipe 104 into the pipe 94 so as to gradually slow down the motor 90 before the detent 96 moves into engagement with the aperture 97. When the piston 100 moves downwardly (Fig. 10), the limit switch 218 is closed to hold the solenoids 176 and 199 energized during the indexing movement of the link chains 75 and 76. When the detent 96 again moves upwardly into the aperture 97, the limit switch 218 is again opened to deenergize the solenoids 196 and 199.

During the indexing movement of the work holders 110, while the solenoid 199 is energized, fluid under pressure passes from the valve chamber 195 through the pipe 67 into the cylinders 59, 59a and 59b to rock the wheel heads 31, 31a and 31b to inoperative positions. At the same time fluid passes through the pipe 49 into the cylinder chambers 50, 50a and 50b which serves to move the wheel slide 14 upwardly, the wheel slide 17 downwardly, and the wheel slide 20 toward the right into the positions illustrated in Fig. 1. As soon as the limit switch 218 opens to break the circuit thereby deenergizing the solenoids 176 and 199, the shuttle valve 190 will be shifted into the position illustrated in Fig. 10 so that fluid passing through the valve chamber 195 will pass through the pipes 65 into the cylinder chambers 66, 66a and 66b to rock the wheel heads 31, 31a and 31b into operative positions with the follower shoes 42, 42a and 42b in operative engagement with the master form or template 128. At the same time fluid under pressure passes through the pipe 49 into the cylinder chambers 50, 50a and 50b to traverse the wheel slide 14 downwardly, the wheel slide 17 upwardly and the wheel slide 20 toward the right (Fig. 1) simultaneously to grind the side faces 24, 25 and 26 of the plates of glass 27 and 27a. During this grinding operation pressure within the cylinder chambers 66, 66a and 66b serves to maintain the follower shoes 42, 42a and 42b in operative engagement with the respective sides of the master form or template 128. When the wheel slides 14, 17 and 20 reach the ends of their grinding strokes, the machine stops. The machine remains in an idle condition until the operator again presses the push button switch 217 to start the next grinding cycle.

Before the work holder 110 is indexed from position 110 into position 110a, a pair of work pieces 27 and 27a are loaded into an operative position within the work holder 110. As the indexing movement of the chains 75 and 76 is started, the rollers 145 and 146 move into engagement with the cam faces 147 which serves through the toggle levers 140 and 141 to swing the clamping plates 131 and 132 toward each other to clamp the new work pieces 27 and 27a in position on the work holder 110 for a grinding operation. As previously described, when successive work holders 110 are indexed into position 110c, the washer guard 150 is automatically lowered into the position illustrated in Fig. 4 after which a stream of cleaning or washing fluid passing through the nozzles 151 removes the residue of coolant or cutting fluid not only from the work pieces which have been ground but also from the entire work holder. When successive work holders are indexed into position 110d, the rollers 145 and 146 ride from the cams 147 and thereby release the compression of the springs 137 to swing the clamping plates 131 and 132 in opposite directions into the position illustrated in Fig. 11 so that the ground plates of glass 27 and 27a may be readily removed therefrom.

Each successive grinding cycle is initiated manually by closing the switch 217. The remainder of the grinding cycle is automatically performed as above described.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a grinding machine for grinding edge portions of plate glass having a base, a traversable wheel slide, a movable wheel head on said slide, a rotatable grinding wheel on said head, means for traversing said slide, an endless work conveyer, a plurality of spaced work holders fixedly mounted on said conveyer, a master form on each of said holders, means including a motor driven gear mechanism automatically to index said conveyer successively to convey plates of glass having edge portions to be ground to and from a grinding position, a follower on said wheel head, means to move the wheel head transversely relative to the wheel slide so as to move the follower to and from operative engagement with said form, and yieldable means to maintain said follower in operative engagement with said form to facilitate grinding an edge portion on the work piece to a predetermined size and contour.

2. In a grinding machine as claimed in claim 1, in combination with the parts and features therein specified in which the work holder includes a pivotally mounted clamping member for clamping a work piece in a predetermined position relative to the template, and means including a cam actuated mechanism for actuating said clamping member when the work holder is indexed from a loading position to a grinding position to clamp a work piece therein for a grinding operation and to release said clamping member when the work holder is indexed to an unloading position.

3. In a grinding machine as claimed in claim 1, in combination with the parts and features therein specified in which the work holder includes a pivotally mounted clamping member for clamping a work piece in a predetermined position relative to the template, toggle actuated mechanism on said work holder for actuating said clamping member, and means including a cam automatically to actuate said toggle levers when the work holder is indexed from a loading to a grinding position to clamp a work piece therein for a grinding operation and to release said clamping member when the work holder is indexed to an unloading position.

4. In a grinding machine for grinding edge portions of plate glass having a base, a traversable wheel slide, a movable wheel head on said slide, a rotatable grinding wheel on said head, a piston and cylinder for traversing said slide, a control valve therefor, an endless chain-type work conveyer, a plurality of spaced work holders fixedly mounted on said conveyer, a master form on each of said holders, means including a motor driven gear mechanism automatically to index said conveyer successively to convey plates of glass having edge portions to be ground to and from a grinding position, a follower on said wheel head, means to move the wheel head transversely relative to the wheel slide so as to move the follower to and from operative engagement with said form, and yieldable means to maintain said follower in operative engagement with said form to facilitate grinding an edge portion on the work piece to a predetermined size and contour.

5. In an edge grinding machine for plate glass having a base, a traversable wheel slide, a movably mounted wheel head on said slide, a rotatable grinding wheel on said head, a piston and cylinder for traversing said slide, a control valve therefor, an endless work conveyer having a plurality of spaced work holders for conveying successive work pieces to and from a grinding position, a master form on each of said holders, means automatically to index said conveyer, a follower adjustably fixed on said wheel head, and means including a piston and cylinder to move said wheel head transversely relative to said wheel slide so as to move the follower to and from operative engagement with said form and to maintain the follower in operative engagement therewith during a grinding operation to facilitate grinding an edge portion to a predetermined size and contour.

6. In an edge grinding machine for plate glass having a base, a traversable wheel slide, a movably mounted wheel head on said slide, a rotatable grinding wheel on said head, a piston and cylinder for traversing said slide, a control valve therefor, an endless work conveyer having a plurality of spaced work holders for conveying successive work pieces to and from a grinding position, a master form on each of said holders, means automatically to index said conveyer, a follower adjustably fixed on said wheel head, a piston and cylinder to move said wheel head transversely relative to the wheel slide so as to move the follower to and from operative engagement with said form and to maintain the follower in operative engagement therewith during a grinding operation to facilitate grinding an edge portion to a predetermined size and contour, and means including a manually adjustable slide interposed between the wheel slide and said cylinder to facilitate adjustment of the path of the swinging movement of the wheel head.

7. In an edge grinding machine for plate glass having a base, a traversable wheel slide, a pivotally mounted head on said slide, a rotatable grinding wheel on said head, a piston and cylinder to traverse said slide, an endless conveyer having a plurality of spaced work holders fixedly mounted thereon, a master form on each of said holders, means automatically to index said conveyer to convey plates of glass to be ground to and from a grinding position, a follower adjustably fixed on said wheel head, a piston and cylinder operatively connected to swing said wheel head to and from an operative position with the follower in engagement with said master form and to maintain the follower in engagement therewith during a traversing movement of the wheel slide to facilitate grinding an edge portion of the work piece to a predetermined size and contour, and means including a control valve to control the admission to and exhaust of fluid from both of said cylinders.

8. In an edge grinding machine for plate glass having a base, a plurality of traversable wheel slides, a pivotally mounted wheel head on each of said slides, a rotatable grinding wheel on each of said heads, an independent piston and cylinder for traversing each of said slides, an endless work conveyer having a plurality of spaced work holders, a master form on each of said holders, means intermittently to index said conveyer to convey plates of glass having a plurality of edge portions to be ground to and from a grinding position, a follower adjustably mounted on each of said wheel heads, an independent piston and cylinder for swinging each of said wheel heads to and from an operative position and to maintain the followers in operative engagement with said form during the traversing movement of said slides to facilitate simultaneously grinding a plurality of edge portions on the plate to a predetermined size and contour, and a control valve to control the admission of fluid to said traverse and said wheel head cylinders.

9. In an edge grinding machine for plate glass having a base, a plurality of traversable wheel slides, a pivotally mounted wheel head on each of said slides, a rotatable grinding wheel on each of said heads, an independent piston and cylinder for traversing each of said slides, an endless work conveyer having a plurality of spaced work holders, a master form on each of said holders, means intermittently to index said conveyer to convey plates of glass having a plurality of edge portions to be ground to and from a grinding position, a follower adjustably mounted on each of said wheel heads, an independent piston and cylinder for swinging each of said wheel heads to and from an operative position and to maintain the followers in operative engagement with said form during the traversing movement of said slides to facilitate simultaneously grinding a plurality of edge portions on the plate to a predetermined size and contour, and means including an independent manually adjustable slide interposed between each of said wheel slides and the latter cylinders to facilitate adjustment of the path of the swinging movement of each of the wheel heads.

10. In a grinding machine for grinding a plurality of edge portions on a plate glass having a base, a pair of spaced vertical slide ways thereon, an independent vertically traversable wheel slide on each of said ways, a horizontal slide way, a horizontally traversable wheel slide thereon, a pivotally mounted wheel head on each of said wheel slides, a rotatable grinding wheel on each of said heads, said grinding wheels being arranged simultaneously to grind edges on opposite ends and the top of said plate glass, a work holder for supporting a work piece during grinding, a master form on said holder, a follower adjustably fixed on each of said heads each of which is arranged to simultaneously engage the master form, an independent piston and cylinder to traverse each of said wheel slides, and an independent piston and cylinder to move each of said wheel heads transversely relative to its supporting wheel slide to move the followers into operative engagement with the master form and to maintain them in engagement therewith during a grinding operation to facilitate grinding a plurality of adjacent edge portions to a predetermined size and contour.

11. In a grinding machine for grinding a plurality of edge portions on a plate glass having a base, two pair of spaced vertical parallel slide rods thereon, an independent vertically traversable wheel slide on each pair of said rods, a pair of spaced horizontal parallel slide rods, a horizontally traversable wheel slide thereon, a pivotally mounted wheel head on each of said wheel slides, a rotatable grinding wheel on each of said heads, said grinding wheels being arranged simultaneously to grind edges on opposite ends and the top of said plate glass, a work holder for supporting a work piece during grinding, a master form on said holder, a follower adjustably fixed on each of said heads each of which is arranged to simultaneously engage the master form, an independent piston and cylinder to traverse each of said wheel slides, and an independent piston and cylinder to move each of said wheel heads transversely relative to its supporting wheel slide to move the followers into operative engagement with the master form and to maintain them in engagement therewith during a grinding operation to facilitate grinding a plurality of adjacent edge portions to a predetermined size and contour.

OIVA E. HILL.
CARL G. FLYGARE.

References Cited in the file of this patent

UNITED STATES PATENTS

| Number | Name | Date |
|---|---|---|
| 1,920,076 | Happel | July 25, 1933 |
| 1,929,810 | Edwards et al. | Oct. 10, 1933 |
| 1,966,869 | Owen | July 17, 1934 |
| 2,057,174 | Weber | Oct. 13, 1936 |
| 2,090,067 | Pierce | Aug. 17, 1937 |
| 2,297,827 | Ellenbecker | Oct. 6, 1942 |